United States Patent [19]

Furuto

[11] 4,106,147
[45] Aug. 15, 1978

[54] STOP MECHANISM FOR SHEARING APPARATUS

[75] Inventor: Takashi Furuto, Komatsu, Japan

[73] Assignee: Kabushiki Kaisha Komatsu Seisakusho, Tokyo, Japan

[21] Appl. No.: 779,567

[22] Filed: Mar. 21, 1977

[30] Foreign Application Priority Data

Mar. 19, 1976 [JP] Japan .................................. 51-29310

[51] Int. Cl.² .............................................. B26D 7/16
[52] U.S. Cl. .......................................... 10/25; 83/468; 269/317
[58] Field of Search .................... 83/467, 467 A, 468, 83/268, 269; 269/317; 10/25

[56] References Cited

U.S. PATENT DOCUMENTS

| 844,746 | 2/1907 | Rice | 83/467 R |
|---|---|---|---|
| 1,031,924 | 7/1912 | Hallock | 83/467 R |
| 2,589,033 | 3/1952 | Baumgartner | 83/467 R |
| 2,964,004 | 12/1960 | Carper | 83/467 A |
| 3,039,344 | 6/1962 | Hercik | 83/467 X |
| 3,892,155 | 7/1975 | Gerlach | 83/467 R |
| 3,943,846 | 3/1976 | Geisow | 83/467 R |

*Primary Examiner*—J. M. Meister
*Attorney, Agent, or Firm*—Armstrong, Nikaido, Marmelstein & Kubovcik

[57] ABSTRACT

In shearing apparatus comprising a fixed and a movable shear element for shearing work such as wire into desired lengths, a stop member is provided for stopping the wire as same is fed endwise through the fixed shear element. Each time the wire length projecting out of the fixed shear element is cut off, the stop member is pivoted against the force of a spring to relieve the impact of the shearing operation exerted thereon. For adjustably moving the stop member toward and away from the fixed shear element, the stop member is mounted on a carriage having a tapped hole through which extends a threaded first shaft geared to a second shaft. This second shaft can be rotated manually for moving the carriage toward or away from the fixed shear element and can be locked in a desired angular position by a locking pin which is spring biased into engagement in any of several circumferentially spaced indentations formed in a collar on the second shaft.

2 Claims, 5 Drawing Figures

STOP MECHANISM FOR SHEARING APPARATUS

BACKGROUND OF THE INVENTION

1. Field of the Invention

This invention relates to a stop device for use in apparatus for shearing wire, rod, or like elongate work into desired lengths, and more specifically to such a device for stopping the work as same is fed in its longitudinal direction before being cut off into a desired length. The shearing apparatus including the stop device in accordance with this invention is contemplated for use preferably in or with a header or machine which forms the heads of rivets, bolt blanks, screw blanks, and similar products, by upsetting the ends of the wire lengths, but with no unnecessary limitation thereto being intended.

2. Description of the Prior Art

In the stop device as heretofore constructed and used for the purpose under consideration, there has been provided a stop member which has a working surface formed at an angle to the plane normal to the predetermined direction in which wire or like work is fed. As the work is fed endwise into abutting contact with the working surface of the stop member, therefore, an unoccupied space is created therebetween which is intended to lessen the impact of shearing operation transmitted to the stop device.

The sloping stop surface of the prior art device, however, is incapable of effectively relieving the impact of shearing operation, so that the stop member and other parts of the device have been very liable to suffer damage or rapid aging by the repeated shearing operation. Furthermore, since the length into which the wire is cut off is determined by the distance between the stop member and the fixed shear element of the shearing apparatus, the sloping stop surface of the prior art device is easy to cause irregularity in the wire lengths produced.

A further objection to the prior art stop device concerns its mechanism for moving the stop member toward and away from the fixed shear element for adjustably varying the length into which wire is to be cut off. This mechanism, usually employing worm gearing, has been such that the stop device has been made unnecessarily complex in construction.

SUMMARY OF THE INVENTION

It is an object of this invention to provide an improved stop device for use in shearing apparatus which is capable of effectively protecting itself from the impact of shearing operation.

Another object of the invention is to provide simplified means for adjustably moving the stop member of the stop device toward and away from the fixed shear element of the shearing apparatus.

The stop device in accordance with this invention is perhaps best characterized by a stop member pivotable about an axis at right angles with the predetermined direction in which wire or like work to be sheared is fed. When the work is sheared, the stop member pivots away from its working position against the force of resilient means such as a spring, thereby protecting itself and other parts of the device from the impact of the shearing operation. The surface of the stop member with which the work is fed into abutting contact can therefore be disposed in a plane normal to the predetermined feed direction of the work when the stop member is in its normal or working position, so that the wire or the like can be cut off into exact lengths required.

According to another feature of the invention, the stop member is mounted on a carriage movable in the predetermined feed direction of the work for adjustably varying the length into which the work is to be cut off. In a preferred embodiment of the invention, for moving the carriage toward and away from the fixed shear element of the shearing apparatus, a threaded first shaft is rotatably mounted on frame means and extends through a tapped hole in the carriage. This first shaft is connected via bevel gearing to a second shaft also rotatably mounted on the frame means. Equipped with a handle, the second shaft can be manually rotated to move the carriage back and forth as required.

Since it is highly undesirable for the stop member to be displaced during the progress of successive shearing operations, a locking mechanism should preferably be provided for immovably holding the stop member at the exact desired distance from the fixed shear element. In the preferred embodiment the locking mechanism includes a pin which is spring biased into engagement in any of several circumferentially spaced indentations formed in a collar on the second shaft. Conveniently situated in the adjacency of the handle on the second shaft, the locking mechanism can be easily held unlocked while the second shaft is being rotated.

The above and other objects, features and advantages of this invention and the manner of attaining them will become more apparent, and the invention itself will best be understood, upon consideration of the following description of the preferred embodiment taken together with the accompanying drawings.

DESCRIPTION OF THE PREFERRED EMBODIMENT

Figure 1:
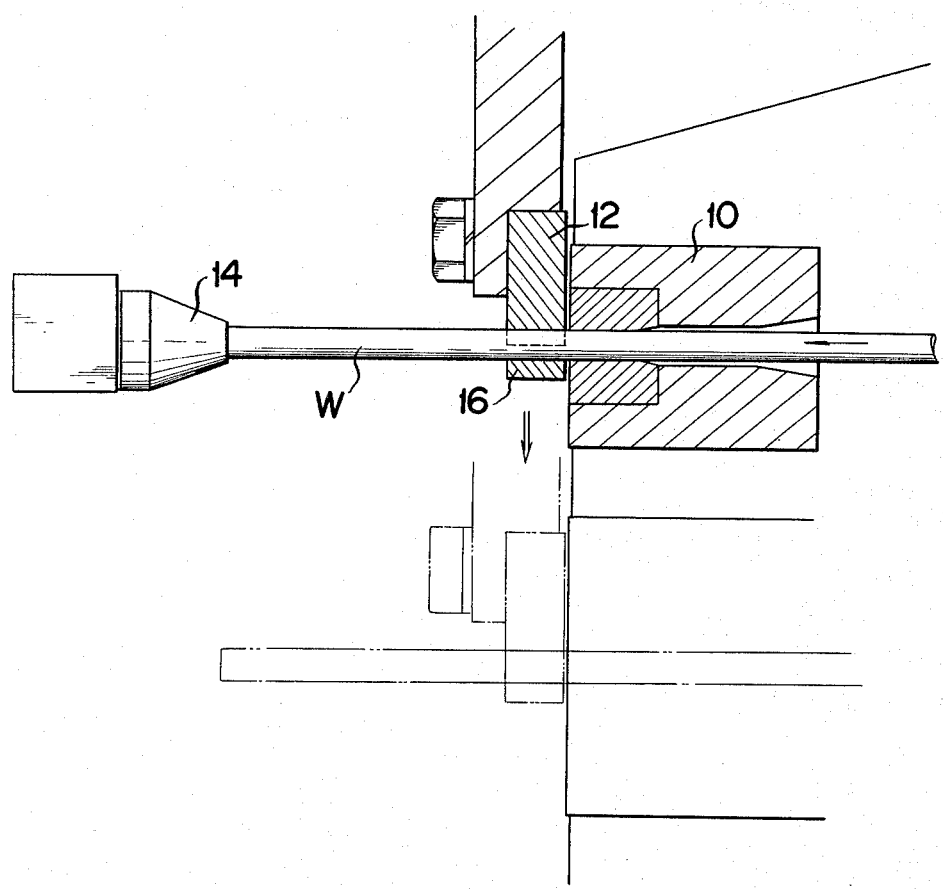
FIG. 1 is a partial, horizontal sectional view schematically illustrating the shearing apparatus suitable for use with the stop device in accordance with this invention, with the shearing apparatus being adapted for use in or with a heading machine.

A typical application of the stop device in accordance with this invention will be understood upon consideration of FIG. 1, which schematically illustrates shearing apparatus incorporated in or with a heading machine. The shearing apparatus comprises a fixed shear element 10 through which continuous wire stock W to be sheared and headed is fed intermittently in a predetermined direction, as indicated by the arrow, and a movable shear element 12 which is reciprocated between a cutting position indicated by the solid lines and a transfer position indicated by the dot-and-dash lines.

Shown at 14 is a stop member included in the stop device in accordance with this invention. The continuous wire stock W is fed through the fixed shear element 10 into abutting contact with the stop member 14, so that a length of wire to be cut off projects out of the fixed shear element. The projecting wire length is clamped by a clamp mechanism 16 against the movable shear element 12 when the latter is in the cutting position. This clamp mechanism is movable with the movable shear element between the cutting and the transfer positions.

Thus, as the movable shear element 12 travels with the clamp mechanism 16 from the cutting toward the transfer position, the wire length that has been projecting out of the fixed shear element 10 is cut off by shearing action. The severed wire length is subsequently transported, while being held clamped, to the transfer position, where the wire length is unclamped and transferred to, for example, the first of several successive heading stations.

The clamp mechanism 16 suitable for use in the shearing apparatus is described and claimed in T. Furuto copending U.S. patent application Ser. No. 751,728, filed on Dec. 17, 1976 and assigned to the instant assignee. The mechanism for reciprocating the movable shear element 12 between the cutting and the transfer positions is described and claimed in T. Furuto copending U.S. patent application entitled, "Apparatus for Shearing Wire, Rod, or the Like", filed substantially concurrently herewith and also assigned to the instant assignee.

FIGS. 2 through 5 illustrate in detail the stop device including the stop member 14 in accordance with the invention. As will be seen from FIGS. 2 through 4, the stop device includes a frame 18 to which there is screwed or otherwise fastened at 20 a base 22 having a pair of parallel spaced guide members 24 also screwed or otherwise fastened thereto at 26. The base 22 and the pair of guide members 24 coact to provide a guideway in the form of an undercut guide groove 28 extending in the aforesaid predetermined direction in which the continuous wire stock is fed intermittently through the fixed shear element 10 shown in FIG. 1. The continuous wire stock fed in the predetermined direction is indicated at W by the dot-and-dash lines in FIG. 2.

Slidably fitted in the guideway 28 is a carriage or slide 30 integrally comprising a block 32 and a bracket 34 with a spacing therebetween. A pivot pin 36 is immovably supported at both ends by the block 32 and the bracket 34 and extends in a direction at right angles with the predetermined direction in which the continuous wire stock W is fed. The stop member 14 is pivotally mounted on the pivot pin 36, preferably via a stop holder 38 having a pair of flanged bushings 40 for direct sliding contact with the pivot pin.

Figure 5:
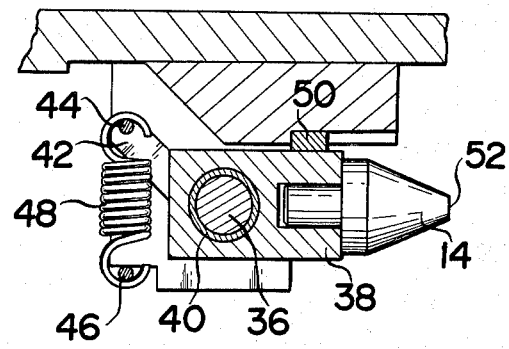
FIG. 5 is a sectional view taken along the line 5—5 of FIG. 2.

As best shown in FIG. 5, the stop holder 38 is integrally provided with an arm 42 projecting rearwardly, or toward the left as viewed in the drawing, therefrom and having a spring retainer 44. Another spring retainer 46 is formed on the bracket 34 on the carriage 30. Extending between the pair of spring retainers 44 and 46 is a helical tension spring 48 effective to bias the stop holder 38 and therefore the stop member 14 counterclockwise, as viewed in FIG. 5, about the pivot pin 36. The counterclockwise motion of the stop holder 38 is limited by an abutment 50 on the carriage 30, so that the stop member 14 is normally held in the illustrated working position.

Frustoconical in shape, the stop member 14 has a stop surface 52 which when the stop member is in the working position, is disposed in a plane normal to the predetermined feed direction of the continuous wire stock W.

Thus, the continuous wire stock W can be fed as aforesaid through the fixed shear element 10, FIG. 1, into abutting contact with the stop surface 52 of the stop member 14, with the result that a desired wire length to be cut off projects out of the fixed shear element.

Figure 2:
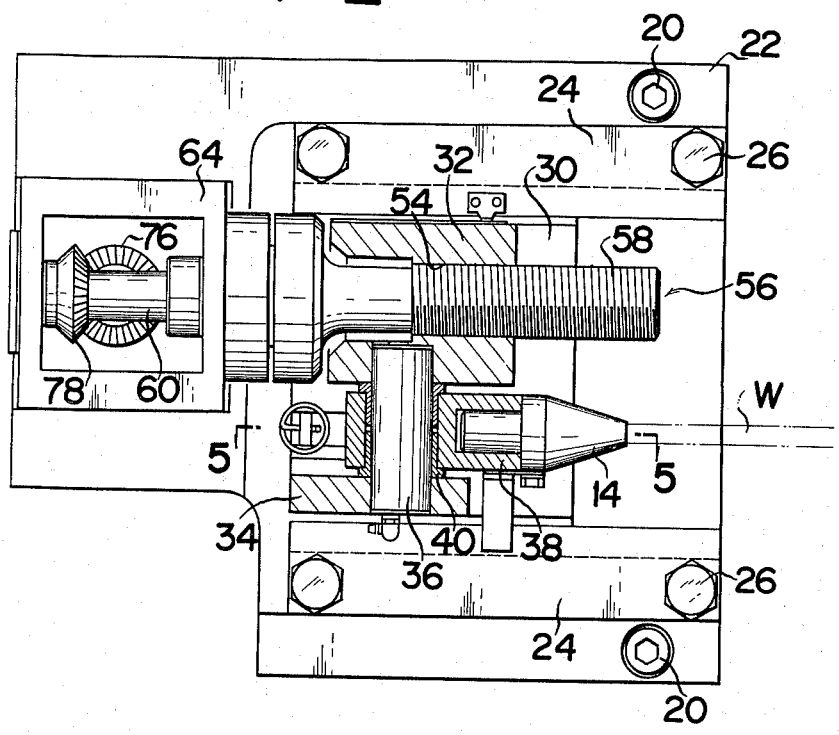
FIG. 2 is an elevational view, partly in section, of the stop device constructed in accordance with the invention.
Figure 3:
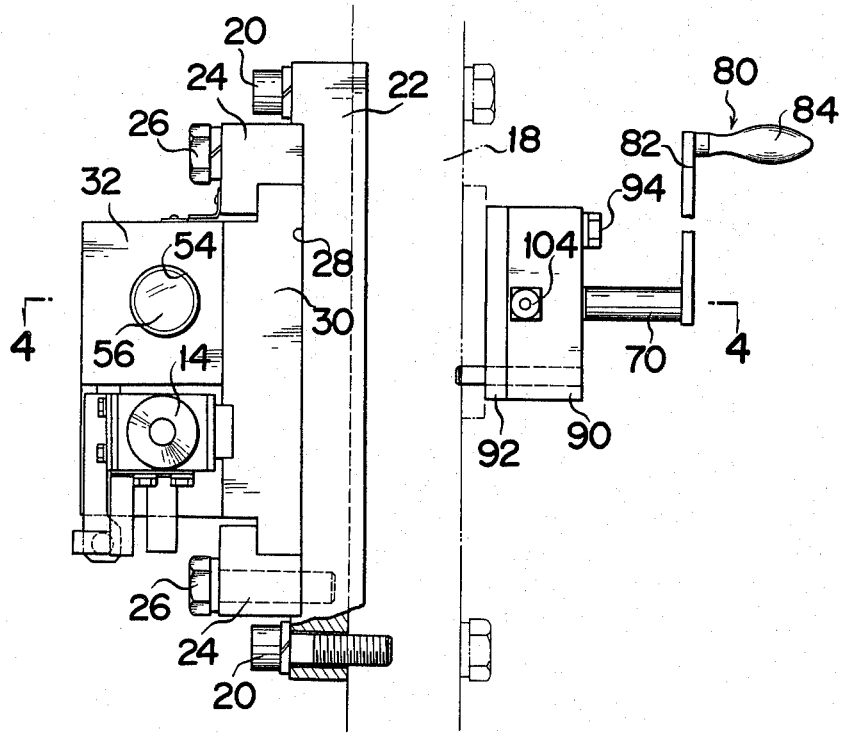
FIG. 3 is the right hand side elevational view of the stop device of FIG. 2.
Figure 4:
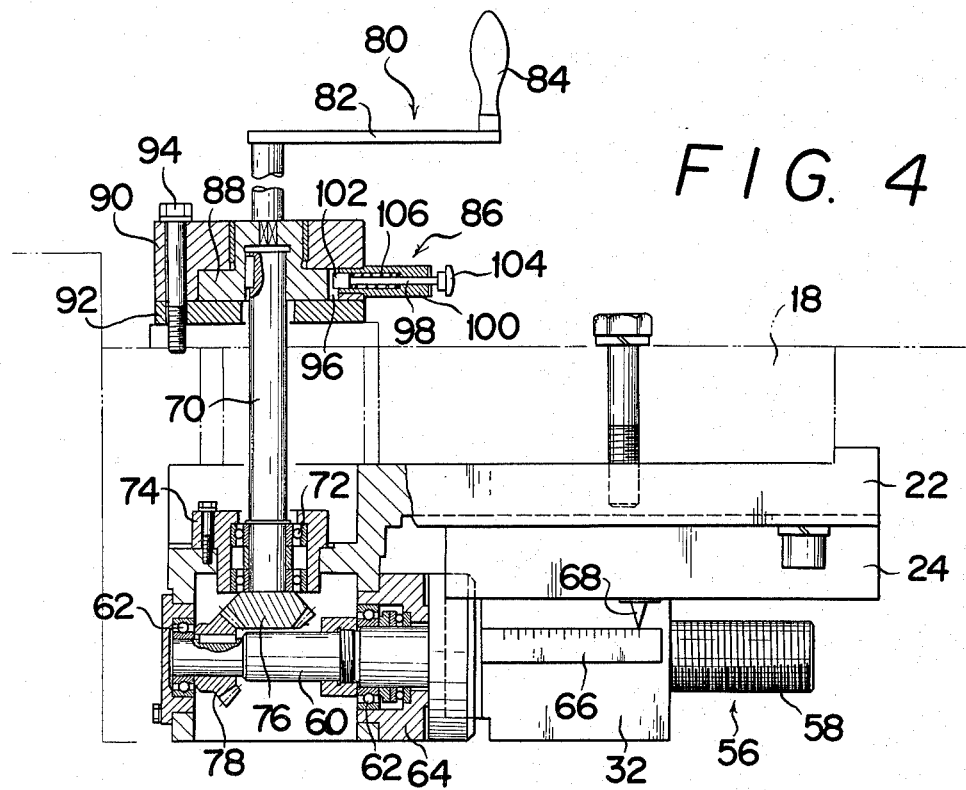
FIG. 4 is an elevational view of the stop device, which is shown partly sectioned along the line 4—4 of FIG. 3.

FIGS. 2 through 4 further illustrate means for adjustably moving the carriage 30, and therefore the stop member 14, along the guideway 28 toward and away from the fixed shear element 10, in order to vary the length of wire to be cut off by each shearing operation. Such means include the aforesaid block 32 on the carriage 30 which has formed therein a tapped or threaded hole 54 extending in the predetermined feed direction of the continuous wire stock W.

A first shaft 56 has its threaded front end portion 58 extending through the hole 54 and held in mesh with its internal thread, and has its stepped rear end portion 60 rotatably supported via bearings 62 by a support 64 rigidly connected to the base 22. The rotation of this first shaft 56 can therefore be translated into the linear motion of the carriage 30 along the guideway 28 toward or away from the fixed shear element 10. Preferably, a suitably graduated ruler 66 should be affixed to the block 32, and a corresponding pointer 68 to one of the guide members 24, for visual indication of the variable distance between the fixed shear element 10 and the stop member 14.

For imparting rotation to the first shaft 56, there is provided a second shaft 70 which is rotatably supported via bearings 72 by a sleeve 74 rigidly connected to the base 22. The second shaft 70 terminates at one end in a bevel gear 76 in mesh with a bevel gear 78 fixedly mounted on the rear end of the first shaft 56. The other end of the second shaft 70, projecting out of the frame 18, is connected to a handle 80 comprising a crank arm 82 and a grip 84 for manually rotating the second shaft. The rotation of the second shaft is of course transmitted to the first shaft 56 via the bevel gearing 76, 78.

The second shaft 70 is provided with a locking mechanism whereby the shaft is locked against rotation in a desired angular position in order to preclude the possibility of any accidental displacement of the carriage 30 along the guideway 28. The locking mechanism is best illustrated in FIG. 4 and is therein generally designated 86.

The locking mechanism 86 includes a collar 88 fixedly mounted on the second shaft 70 for joint rotation therewith. The collar 88 is slidably received between a member 90 and a spacer 92 which are shown to be screwed at 94 to the frame 18. A plurality of indentations 96 (one seen) are formed at constant circumferential spacings in the collar 88.

For movement into and out of engagement with the indented collar 88, a locking pin 98 is slidably mounted in a guide sleeve 100 rigidly connected to the member 90 and is thereby constrained to endwise movement in a radial direction of the collar. The locking pin 98 terminates at one end in an enlargement 102 engageable in any one of the indentations 96 in the collar 88, and at the other end in a knob 104 projecting out of the guide sleeve 100. A helical compression spring 106 is accommodated within the guide sleeve 100 for biasing the locking pin 98 into engagement with the indented collar 88.

In order to rotate the second shaft 70, therefore, the locking pin 98 must first be pulled out of engagement with the indented collar 88 against the bias of the compression spring 106 and must be held pulled back while the second shaft is being rotated. When released, the locking pin is of course pushed by the compression spring into engagement with the indented collar.

Operation

Although the operation and functions of the stop device in accordance with this invention is believed clearly apparent from the foregoing description, further amplification may be made in the following brief summary of such operation and functions. Since the length to which the continuous wire stock W is cut off is determined by the distance between fixed shear element 10 and stop member 14, the position of the latter with respect to the former may first be adjusted through the following procedure.

The operator may grasp the knob 104 with one hand and pull the locking pin 98 out of engagement with the indented collar 88 on the second shaft 70 against the bias of the compression spring 106. With a pull held exerted on the locking pin 98, the operator may turn the handle 80 with the other hand thereby rotating the second shaft 70 relative to the frame 18. The rotation of the second shaft 70 is transmitted through the bevel gearing 76, 78 to the first shaft 56, and the rotation of this first shaft is translated into the linear motion of the carriage 30 toward or away from the fixed shear element 10 via the intermeshing external thread on the first shaft and internal thread on the block 32.

When the stop member 14 on the carriage 30 is moved as above to a position at a desired distance from the fixed shear element 10, as visually confirmed by the indication of the pointer 68 on the ruler 66, the knob 104 may be released thereby permitting the locking pin 98 to slide back toward the collar 88 under the bias of the compression spring 106 to engage in one of its indentations 96. The second shaft 70 is now positively locked against rotation in either direction, so that there is no possibility of the carriage 30, and therefore of the stop member 14, moving accidentally toward or away from the fixed shear element 10 during the subsequent shearing operation.

The continuous wire stock W to be sheared and headed can now be fed through the fixed shear element 10 in the predetermined direction, until it makes abutting contact with the stop surface 52 of the stop member 14, which is then of course held in its working position best shown in FIG. 5. Thus, just the length of the wire stock to be cut off projects out of the fixed shear element 10.

As previously set forth in connection with FIG. 1, the projecting wire length is then clamped against the movable shear element 12 situated in its cutting position. The projecting wire length is cut off immediately as the movable shear element 12 starts travelling from the cutting toward the transfer position together with the clamp mechanism 16. Although the shearing force exerted on the wire stock by the movable shear element is transmitted to the stop member 14 via the wire length in contact therewith, the stop member is then pivoted clockwise, as viewed in FIG. 5, together with the stop holder 38 about the pivot pin 36 against the bias of the tension spring 48 by receiving the reaction of the shearing operation.

The stop member 14 thus escapes from the impact of the shearing operation thereby protecting itself and other parts of the stop device from damage or rapid aging. As the severed wire length is subsequently transported toward the transfer position, the stop member 14 together with the stop holder 38 is pivoted back to its working position under the bias of the extension spring 48 and is held standing by until the movable shear element returns to the cutting position and the next length of wire stock W is fed into abutting contact with its stop surface 52.

It is now clear that the objects as set forth above have been thoroughly attained by the stop device of the foregoing construction and operation. Since, however, many modifications and changes will readily occur to those skilled in the art, it is appropriate that the invention be construed broadly and in a manner consistent with the spirit or scope of the appended claims.

I claim:

1. An apparatus with a fixed and a movable shear element for shearing a workpiece of wire or rod shape into desired lengths in which the workpiece is fed intermittently in a predetermined direction along the axis thereof through the fixed shear element, a stop device comprising, in combination of:
   (a) frame means for defining a guideway extending in said predetermined direction;
   (b) a carriage mounted on said frame means movable along said guideway toward and away from said fixed shear element;
   (c) a stop member having at the distal end thereof a stop surface facing and abutting against a sheared face of the workpiece and mounted on said carriage in a manner such that pivotal movement is permitted about an axis extending perpendicular to said predetermined direction, said stop member being rotated about said axis in one direction by receiving the reaction of the shearing operation thereby absorbing the shock of shearing operation;
   (d) resilient means mounted on said carriage for always biasing said stop means in a direction opposite to said one direction;
   (e) means for limiting the pivotal movement of said stop member in the direction opposite to said one direction so as to restrain the bias of said resilient means, said limiting means being mounted on said carriage;
   (f) means for defining in said carriage a threaded hole extending in said predetermined direction;
   (g) a first shaft rotatably mounted on said frame means and extending through said threaded hole, said first shaft being at least partly threaded externally for engagement with the thread of said threaded hole;
   (h) manually actuable means mounted on said frame means for imparting rotation to said first shaft so as to adjustably moving said carriage along said guideway toward and away from said fixed shear element;
   (i) a second shaft rotatably mounted on said frame means;
   (j) handle means for manually rotating said second shaft relative to said frame means;
   (k) gearing means for transmitting the rotation of said second shaft to the first shaft; and
   (l) means for locking said second shaft against rotation in a desired angular position.

2. The stop device as recited in claim 1, wherein said locking means comprises:
   a collar fixedly mounted on said second shaft for joint rotation therewith;
   there being a plurality of circumferentially spaced indentations in said collar;

guide means immovably mounted on said frame means;

a locking pin mounted in said guide means for movement into and out of engagement in any one of said indentations in said collar; and second resilient means biasing said locking pin into engagement with said indented collar;

said locking pin being adapted to be manually moved out of engagement with said indented collar against the bias of said second resilient means while said second shaft is being rotated.

* * * * *